… … … …

3,143,527
POLYAMIDES FROM ALKYL PIPERAZINES
Emerson La Verne Wittbecker, West Chester, Pa., assignor to E. I. du Pont de Nemours and Company, Wilmington, Del., a corporation of Delaware
No Drawing. Filed Mar. 27, 1959, Ser. No. 802,305
14 Claims. (Cl. 260—78)

The present invention relates to high molecular weight, soluble, hydrophilic polymers made from a methyl substituted piperazine and an aliphatic dibasic acid halide. More particularly, it relates to fibers and films made from these polymers.

Great efforts have been made in the past to increase the moisture absorbency of synthetic fibers. Higher moisture uptake not only improves the way clothes feel by reducing the cold, unnatural hand of synthetic fabrics, but also gives the fabrics better dye affinity. Among the commercial, fully synthetic, linear polymer fibers, moisture absorbencies greater than 8.5% have not been developed, e.g., "Orlon" acrylic fibers absorb 2.5% water, "Dacron" polyester fibers absorb 0.5% water, 66-nylon 8%, and 6-nylon 8–8.5%.

It is an object of this invention to provide a class of polyamides which are both hydrophilic and soluble in certain organic solvents. Another object is to provide a class of high molecular weight polyamides which form useful fibers and films. A further object of this invention is to provide a class of polyamides which are readily adapted to solution spinning techniques. Another object is to provide solutions of this new class of polyamides.

The novel polyamides of the invention are synthetic linear condensation polymers made from methyl substituted piperazine and an essentially alkylene dibasic acid halide. By an "essentially alkylene dibasic acid" is meant a linear acid containing at least two carboxyl groups, which when not joined are separated by an alkylene chain which may be chain-interrupted by oxygen, aromatic radicals or both and where the carboxy groups are attached to a carbon atom not a part of an aromatic ring. Thus the polyamides of the invention contain the following recurring structural unit:

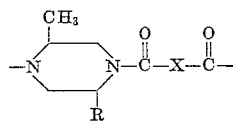

wherein X represents a single valence, alkylene or alkenylene radicals which may be chain-interrupted with oxygen, arylene and oxyarylene groups and R is methyl or hydrogen.

The acid halides which can be used to make the new class of polymers are of the formula HalOC—X—COHal in which X can be a single valence (oxalyl halide) or a linear chain comprising one or more methylene groups which may be interrupted by the p-phenylene or the p-phenylene dioxy radicals. It is preferred, however, that the total length of the carbon chain replacing X in the above formula, is between 0 and 11 carbon atoms. This chain may also have double bonds between chain carbon atoms. Among these acid halides are the series of saturated linear dicarboxylic acid chlorides from oxalyl chloride to 1,11-undecane dicarboxylic acid chloride, the corresponding series having unsaturation, e.g. fumaryl chloride, 2-butene-1, 4-dicarboxylic acid chloride, etc., or the series of aliphatic dicarboxylic acid chlorides which have an aromatic nucleus in the chain, e.g. p-phenylenedioxydiacetic acid chloride, etc.

These polymers are made by interfacial polymerization, in which the two reactants, dissolved independently in non-miscible liquids, are mixed to form a system of two liquid phases, the reaction occurring at the interface. The reaction is described in detail in United States Patent No. 2,831,834 of April 22, 1958. Generally the substituted piperazine is dissolved in water or an aqueous salt solution. The solution is combined with an essentially aliphatic dicarboxylic acid halide dissolved in a water immiscible, usually organic, solvent with vigorous stirring. The reaction is carried out at −10° to +80° C. and optionally in the presence of an acid acceptor. The new polymers precipitate within a few seconds and can be filtered and redissolved in a number solvents to concentrations suitable for the extrusion of all sorts of shaped articles such as fibers, films, ribbons, tapes, bristles, rods, etc.

The following examples are illustrative and are not limiting. All inherent viscosities shown are measured in a 0.5% solution of the polymer in m-cresol unless stated otherwise.

EXAMPLE I 100 g. of methylene chloride is emulsified with 150 cc. of water containing 5.7 grams (0.05 mole) of 2,5-dimethylpiperazine and 10.6 (0.1 mole) of sodium carbonate. The stirred emulsion is cooled to 5° C. and a solution of 9.15 grams (0.05 mole) of adipyl chloride in 33 g. of methylene chloride is added. The polymer forms almost instantaneously but stirring is continued for 5 minutes. The methylene chloride is then evaporated, leaving white granular polymer which is isolated by filtration, washed and dried. The yield is 9.7 grams (86% of theory) and the inherent viscosity is 1.70. The polymer melts at 290° C.

Clear tough films are melt pressed at about 290° C. In hot water, these films are very sticky, but in boiling water they turn opaque and loose their tackiness. Apparently, this polymer is almost water-soluble until it is crystallized, this latter being effected by boiling water. Films cast from chloroform-methanol (88/12) or 1,1,2-trichloroethane/formic acid (60/40) are very rigid when dry but quite rubbery when wet. The wet, undrawn film strips can be stretched about 4×, but only 2× is permanent draw. These film strips have 60 to 100% recoverable elongation as long as they are kept wet. The water absorption of the undrawn film is 39% and the film increases about 12% in length and width and 10% in thickness on soaking.

The polymer exhibits surprising wet moldability. A series of film strips are drawn 3.5× in boiling water, and then given a variety of setting treatments while in clamped condition. The shrinkage on being boiled off relaxed is given in the following table (Table I) opposite the conditions used for each heat-setting experiment.

Table I
HEAT SETTING CONDITIONS

| Sample | Temperature (° C.) | Time (min.) | Shrinkage (percent) |
|---|---|---|---|
| A | 85 | 30 | 23 |
| B | [1] 100 | 30 | |
|   | 85 | 10 | 16.5 |
| C | 85 | 10 | |
|   | 200 | 30 | 16.5 |
| D | 85 | 10 | |
|   | 150 | 60 | |
|   | [1] 100 | 30 | 10.4 |
| E | [1] 100 | 30 | |
|   | 150 | 60 | 16.5 |
| F | [2] 25 | [3] 12 | |
|   | [2] 56 | [3] 30 | 21 |

[1] Water. [2] Acetone. [3] Hours.

The unusual set of properties exhibited by the above poly(dimethylpiperazine adipamide) fiber must result from a sensitive balance between crystalline and amorphous areas, glass transition temperature, and water absorption. A similar polyamide made from monomethylpiperazine and adipyl chloride does not become elastic when wet.

This 2,5-dimethylpiperazine adipamide polymer is dissolved in a mixture of chloroform/methanol (88/12). The spinning solution, containing 15% solids, gels on standing overnight, but upon heating, a clear solution results again. This solution is spun at 85° C. through a 5-hole spinneret of 0.08 mm. hole diameter through conventional dry spinning equipment. The fiber is drawn 4× over a hot pin at 250° C. and exhibits the following as-drawn properties:

| | |
|---|---|
| Tenacity | g.p.d.__ 3.3 |
| Elongation | percent__ 8.6 |
| Initial modulus | g.p.d.__ 59.9 |
| Wet recovery at 3% elongation | percent__ 74.1 |
| Wet recovery at 5% elongation | do____ 60.1 |
| Tensile recovery at 3% elongation | do____ 94.7 |
| Tensile recovery at 5% elongation | do____ 90.5 |

Shrinkage on boil-off is 28%.

The following table gives the properties of a fiber spun through conventional dry spinning equipment with a 5-hole spinneret at a head temperature of 81–6° C. and a wind-up speed of 122 y.p.m. The spinning solution is prepared by dissolving 40 grams of the polymer in 140 grams of 1,1,2-trichloroethane/formic acid (60/40). The fibers are drawn at 224° C. 4.5× and exhibit the following properties:

Table II

| Properties | Tenacity (g.p.d.) | Elongation, percent | In. modulus (g.p.d.) |
|---|---|---|---|
| As-drawn | 5 | 15 | 54 |
| Boiled-off | 1.5 | 1.21 | 20 |
| B.O. taut and B.O. relaxed | 2.1 | 86 | 30 |
| Heat set at 150° C | 1.7 | 106 | 0.39 |

This table shows that the fiber properties again are extremely sensitive to water.

EXAMPLE II 0.036 mole (4.1 g.) of 2,5-dimethylpiperazine is dissolved in 150 cc. water containing 0.06 mole (6.36 g.) of sodium carbonate. The solution is pre-emulsified with 100 g. of methylene chloride under rapid stirring and subsequently a solution of 0.03 mole (4.59 g.) fumaryl chloride in 66 g. methylene chloride while stirring is continued for a few minutes. The polymer is obtained in a yield of 86%; it has an inherent viscosity of 4.00 and a melt temperature of above 350° C. The polymer is soluble in concentrated sulfuric acid, m-cresol, 98% formic acid, a mixture of chloroform/methanol (88/12), a mixture of chloroform/formic acid (60/40), 1,1,2-trichloroethane/formic acid (60/40), and acetic acid.

By dissolving 0.6 mole (68.4 g.) dimethylpiperazine in 1400 cc. of water, forming a pre-emulsion with 800 g. of methylene chloride, and adding 0.5 mole (76.5 g.) fumaryl chloride in 660 g. methylene chloride after the addition of 1.0 mole (106 g.) of sodium carbonate to the pre-emulsion, poly(dimethylpiperazine fumaramide) is obtained with an inherent viscosity of 2.93 and a melting point of above 350° C.

54 grams of this polymer is dissolved in 250 cc. of formic acid of 98% purity (contains 2% water) to form a solution with 15% solids. The solution has a viscosity of 100 to 150 poises. This spinning solution is extruded through conventional dry spinning equipment with a 5-hole spinneret.

| | |
|---|---|
| Hole diameter | 0.08 mm. |
| Spinneret temp | 81–86° C. |
| Heat temp | 75° C. |
| Pump speed | 6 r.p.m. |
| Spinning pressure | 125 lbs./in.$^2$. |
| Air temp | 150–160° C. |
| Column temp | 178–180° C. |
| Wind-up speed | 122 y.p.m. |
| Cross-section | Peanut. |

After the yarn is drawn 2.5× over a pin at 265° C., it has the following characteristics:

| | |
|---|---|
| Inherent viscosity | 2.93. |
| Tenacity | 2.1 g.p.d. |
| Elongation | 4.8%. |
| Initial modulus | 64 g.p.d. |
| Fiber stick temperature | 303° C. |
| Zero strength temperature | Above 450° C. |

X-ray crystallinity studies show that the as-drawn fiber is amorphous but oriented, but high crystallinity and high orientation result after wet drawing. The yarn is found to be very hydrophilic, since it absorbs 20% water after being soaked 4 hrs. in water of 25° C. The yarn dyes well with acid and dispersed dyes. It can also be dyed with vat, basic, and direct dyes.

This yarn, as well as films cast from this polymer, are soft and rubbery when wet. However, prolonged soaking in water causes crystallization of the yarn and almost complete loss of rubberiness. This treatment renders the yarn drawable in steam and gives the best yarn properties. Thus, an oriented, moderately crystalline yarn of moderately high tenacity is obtained by drawing the yarn in steam after soaking it in water to cause crystallization. While the Table II shows the yarn properties drawn 2.5× without prior water soak, Table III lists properties after drawing it 3× in 10 lbs. steam pressure, in which the first (1) of the two figures is the measured property after a taut boil-off, and the second (2) figure reflects the properties measured after a taut boil-off and a subsequent relaxed boil-off; the third (3) number reflects the same property measured at 90° C. wet:

Table III

| | 1 | 2 | 3 | 1 | 2 | 3 | 1 | 2 | 3 |
|---|---|---|---|---|---|---|---|---|---|
| Tenacity, g.p.d | 3.7 | 3.1 | 2.3 | 2.2 | 2.2 | 2.1 | 2.1 | 2.2 | 1.8 |
| Elongation, percent | 11 | 29 | 35 | 4.5 | 22 | 33 | 4.4 | 24 | 25 |
| Init. mod., g.p.d | 73 | 51 | 3.1 | 7.4 | 35 | 2.9 | 71 | 32 | 2.6 |

The shrinkage of the taut boiled-off fiber is 11.3% and the flex life of the drawn unsoaked fiber is 18,681 cycles. The moisture regain on the yarn is 19.6% at 88% relative humidity, the fiber stick temperature 323–30° C., and the zero strength temperature above 400° C.

EXAMPLE III

A solution of 6.3 g. (0.055 mole) 2,5-dimethylpiperazine and 10.6 g. (0.1 mole) sodium carbonate in 170 cc.

water is saturated with sodium chloride. This solution is emulsified with 133.6 g. methylene chloride and cooled to 0°. At this temperature, a solution of 6.35 g. (0.05 mole) oxalyl chloride in 66.8 g. methylene chloride is added with continuous stirring. After a few minutes the methylene chloride is evaporated and the white polymer is isolated by filtration. It is washed with hot water and dried. The yield is 6.5 g. (78% of theory), the polymer stick temperature is >400° C., and the inherent viscosity is 1.64.

A film cast from this polymer from formic acid is clear, tough, and flexible. Film strips can be drawn 3× at 330°. The shrinkage on boil-off is 1.5% and the X-ray pattern shows the film sample to be amorphous but oriented. It does not deorient on boil-off. The water absorption of the unoriented film is 43% but it does not become rubbery when wet.

In a variation of this example, 4.2 g. 2,5-dimethylpiperazine are dissolved in 150 cc. water containing 6.36 g. sodium carbonate. At 0°, a solution of 3.81 g. oxalyl chloride in 33.4 g. methylene chloride is added with stirring and the almost instantaneously precipitating polymer separates as before. A yield of 43.6% is obtained. The polymer has a stick temperature of 375° C. and an inherent viscosity of 2.11.

Several poly(2,5-dimethylpiperazine oxamide) batches made according to this example and with inherent viscosities from between 1.86 and 2.12 are combined. A spinning solution containing 17% solids is made by dissolving 28.0 g. polymer in 136 g. formic acid. This solution is spun at 90° C. through standard dry spinning equipment. The fiber can be drawn 3× over a pin at 320° C. In the boil-off it shrinks 3.5%. The fiber shows orientation but is amorphous. Table IV gives some additional properties.

*Table IV*

| | As-drawn | Boiled-off 90° | | Boiled-off taut and boiled-off relaxed | Heat set at 200° and boiled-off relaxed |
|---|---|---|---|---|---|
| | | Dry | Wet | | |
| Tenacity (g.p.d.) | 2.5 | 2.1 | 0.71 | 1.9 | 2.2 |
| Elongation E (g.p.d.) | 7.1 | 17 | 21 | 17 | 11 |
| Init. mod. (g.p.d.) | 70 | 50 | 9.9 | 46 | 53 |
| Work recovery at 3% E (percent) | 94 | 94 | 27 | 93 | 93 |
| Tensile recovery at 5% E (percent) | 97 | 94 | 51 | 97 | 98 |

EXAMPLE IV

In variation of the first part of Example III, azelayl chloride in methylene chloride is mixed with 2,5-dimethylpiperazine in water with a 10% excess of the latter and in the presence of sodium carbonate. The collected white polymer, produced at a yield of 96%, has an inherent viscosity of 2.87 in a tetrachloroethane/phenol (60/40) mixture as a 0.5% solution. It melts at 185°, is soluble in chloroform, m-cresol, ethylene chlorohydrine, dimethylformamide, 98% formic acid, tetrafluoropropanol, chloroform/methanol 87.5/12.5, or tetrachloroethane/formic acid 60/40. It is melt-spun at 291° C. to produce a fiber which can be drawn 4× and which has an inherent viscosity of 1.04.

EXAMPLE V

Replacing azelayl chloride in Example IV with sebacyl chloride gives 85% yield of polymer with an inherent viscosity of 1.84 in tetrachloroethane/phenol 60/40. It has the same solubility characteristics as poly(2,5-dimethylpiperazine azelamide) and melts at 165°. The melt-spun fiber has a water absorption of 125% based on the fiber weight.

EXAMPLES VI TO X

These examples are made in the manner described in more detail above. Aqueous solutions of 2,5-dimethylpiperazine are used with sodium carbonate as the acid binder. The respective acid chlorides are dissolved in methylene chloride, and amounts equimolar to the ones in the previous examples are used. The properties of these polymers are tabulated in Table V.

*Table V*

| Acid chloride from— | Yield, percent | Visc. | $H_2O$ absorption, percent | Melt temp., degrees | Cryst. M. Pt., degrees |
|---|---|---|---|---|---|
| VI. p-phenylene-dioxy-diacetic acid | 92 | 2.37 | 11 | 270 | 265 |
| VII. 3,3'-(p-phenylene dioxy) dipropionic acid | 97 | | 18 | 225 | 185 |
| VIII. 4,4'-(p-phenylene dioxy) dibutryric aid | 80 | | 98 | 185 | 150 |
| IX. 5,5'(p-phenylene dioxy) divaleric acid | 95 | 1.07 | >200 | 165 | 127 |
| X. p-phenylene diacetic acid | | 0.68 | | 350 | |

The above polymers are soluble in a number of common solvents such as 98% formic acid, chloroform, ethylene chlorohydrin, etc.

EXAMPLE XI

The polymer of Example VI is dry cast and melt pressed into fibers and the samples drawn under various conditions. In Table VI these conditions are given together with some properties of the fiber samples.

*Table VI*

| | Draw ratio | Max. Shrink., percent | Shrink. after heat-setting,* percent |
|---|---|---|---|
| Dry cast, drawn in water at 65° | 8× | 65 | 0 |
| Do | 4× | 67 | 0 |
| Melt pressed, drawn in water at 95° | 8× | 75 | 8 |
| Do | 4× | 42 | 5 |
| Melt pressed, drawn at 165° | 8-9× | 75 | 25 |
| Do | 4× | 69 | 25 |

\* The heat-setting is carried out at 150° for at least 20 minutes.

From Table VI it is apparent that film shrinkage after heat-setting can be controlled. This property is of great importance when dealing with wet moldable polymers. It is significant that shrinkage of films, drawn to the maximum or drawn only to half the maximum draw ratio, can be reduced to zero. Examination of X-ray patterns confirm the fact that the reduction of the shrinkage is due to the crystallization of the polymer upon heat-setting. This increase in crystallinity of the polymer upon heat-setting probably explains the change of the wet-moldable polymer into an ordinary, so-called "hard" polymer.

The polymers of the present invention are also useful in copolymers. Replacing up to about 40% of the acid chlorides of the present invention by another diacid chloride produces valuable polymers with similar characteristics as the homopolymers. Thus the products of the invention must have at least 60% of the repeating structural unit obtained by reacting substituted piperazine with an essentially aliphatic dibasic acid halide as defined above.

EXAMPLE XII

A copolymer, made from 2,5-dimethylpiperazine and an adipic acid chloride/terephthaloyl chloride mixture of a 70/30 molar ratio by dissolving 5.7 g. (0.05 mole) of the piperazine derivative in 150 cc. of water, adding 10.6 g. (0.1 mole) sodium carbonate, and stirring it with a solution of 0.5 mole of the above acid chloride mixture in 167 g. methylene chloride, precipitates as a white powder in theoretical yield. It has an inherent viscosity of 2.05, and also shows high water absorption in dry spun fibers.

EXAMPLE XIII

An ice cold solution of 3.3 g. (0.033 mol) of methyl piperazine and 6.4 g. (0.06 mol) of sodium carbonate in 150 ml. of water is placed in an ice-jacketed Waring Blendor. The aqueous solution is emulsified with 25 ml. of methylene chloride and a solution of 5.49 g. (0.03 mol) of adipyl chloride in 100 ml. of methylene chloride is added to it drop-wise over a period of 45 seconds. The mixture is stirred for 5 minutes, and then the methylene chloride is evaporated on a steam bath. The polymer is washed twice with water and dried at 70° C. The yield of polymer is 6.3 g. (100%), it has an inherent viscosity in m-cresol of 0.85, sticks to a heated bar at 255° C., and it is soluble in the following solvents: acetic acid, acetic acid/water (95/5), formic acid/chloroform (15/85), methanol/chloroform (12/88), formic acid, ethylene chlorohydrin and ethylene chlorohydrin/water (60/40). The polymer is melt-spun in the usual fashion into characteristic strong fibers. It can also be dry-spun.

EXAMPLE XIV

An ice-cold solution of 6.4 g. (0.06 mol) of sodium carbonate and 3.3 g. (0.033 mol) of methylpiperazine in 150 ml. of water is placed in an ice-jacketed Waring Blendor. The aqueous solution is emulsified with 25 ml. of methylene chloride and a solution of 7.17 g. (0.03 mol) of sebacyl chloride in 100 ml. of methylene chloride is added over a period of 40 seconds. The mixture is stirred for 5 minutes, and then the methylene chloride is evaporated on a steam bath. The polymer is washed twice with water and dried in vacuo at 70° C. The yield of polymer is 7.9 g. (100%), it has an inherent viscosity in m-cresol of 0.63, sticks to a heated bar at 90° C., and it is soluble in the following solvents: acetic acid, acetic acid/water (95/5), formic acid/chloroform (15/85), methanol/chloroform (12/88), chloroform, methylene chloride, formic acid, chloroethanol, and chloroethanol/water (60/40). The polyamide is melt spinnable into strong fibers.

The moisture uptake values referred to above were obtained in a moisture regain test carried out by leaving a shaped polymeric sample in a controlled humidity atmosphere at a controlled temperature until its weight remains constant, weighing the sample, completely drying the sample, and weighing it again. The weight difference indicates the moisture uptake.

The water absorption values referred to above were obtained in a test carried out by soaking a shaped polymeric article in water, removing it from the bath, quickly blotting it, weighing, completely drying, and weighing again. The weight difference is the water absorption of the sample.

The process of the present invention can be varied within wide limitations, as shown in the examples. Thus, the interface can be created by a number of immiscible liquid-liquid interfaces. For practical purposes, water is usually used as a solvent for the methylpiperazine. The acid chloride can be dissolved in a great number of water immiscible solvents. Among those are methylene chloride, chloroform, carbon tetrachloride, benzene, nitrobenzene, chlorobenzene, dichlorobenzenes, 1,1,2-trichloroethane, 1,1,2,2-tetrachloroethane, trichloroethylene, 1,2,3-trichloropropane, etc. The water immiscible solvent must be less reactive to either one of the monomers than they are to one another. The high speed of the reaction also permits the use of certain water-miscible organic solvents for the acid chloride as long as the aforesaid requirement is fulfilled.

Since the reaction produces hydrochloric acid as a by-product, it is advantageous, although not required, to add an acid-binder to the reaction mixture. This acid-binder tends to increase the yield of the polymerization reaction.

Among the recommended acid-binders are mentioned: sodium carbonate, sodium bicarbonate, triethanolamine, an excess methylpiperazine, etc.

The interfacial polymerization can be carried out within a wide range of temperatures but no advantage is seen in using heating or cooling equipment since the reaction proceeds almost instantaneously at room temperature to form a satisfactory polymer at a satisfactory yield. Sometimes it has been found advantageous to employ temperatures slightly below room temperature in the polymerization reaction to prevent side reactions. Thus, the temperature range from about −10° C. to about +30° C. is preferred for the reaction, although the upper limit can be raised to about 80° without undue loss in yield. It has also been found advantageous to use vigorous stirring during the polymerization reaction. This stirring apparently produces a much larger liquid/liquid interface and therefore increases the contact areas between the co-reactive monomers and the overall reaction speed.

Maximum physical properties are developed in the above fibers by drawing them up to 4 times their as-spun length. Drawing pins, bars, rollers, can be used as well as any other means capable of being heated to the above temperature range. Heat-setting (dry or wet) may be necessary to provide good dimensional stability. Obviously, polymers with lower molecular weights are less desirable for the development of high physical properties by drawing. Thus, the preferred inherent viscosity of a polymer to be drawn is above about 1.0 in a 60/40 mixture of tetrachloroethane and ethane, for the production of higher tenacity fibers.

The polymers made according to the present invention are all film- and fiber-forming and show as a group, the surprising fact of being hydrophilic. This distinguishes the aforementioned polymers from other commercial synthetic fibers, e.g., nylon, cellulose acetate, polyester, polyacrylonitrile, hydrocarbon polymers, etc. The hydrophilic character is very well recognized as an important property for a fiber intended for textile use: it renders a fabric made out of this fiber more readily dyeable and more comfortable in wear, since it absorbs moisture from the air and perspiration.

Furthermore, the polymers of the present invention have better electrostatic properties (due to the high moisture absorbency), better soilability, less odor retention, and improved washability. These are particular improvements over existing fully synthetic, commercial textile fibers, since it has been noticed that these former commercial fabrics retain odors from perspiration, etc., and, after extended wash-and-wear cycles, have a grayish appearance. In addition, the present polymers can be dyed without the use of carriers which makes their finishing simpler and more economical.

These characteristics of the above polymeric fibers can be used to great advantage in a number of applications. The fibers can be made into fabrics of high water absorbency or blended into fabrics with commercial fibers of known low water absorbency to improve these fabrics in that respect. It is for the above reasons that water absorbency of a fabric is a valuable characteristic which improves the hand and feel of such a fabric, particularly when this fabric is used for garments touching the skin, as in underwear, shirts, socks, etc. Fibers well suited to be blended with the fibers of the present invention are the polyamides, polyacrylonitriles, poly(vinyl compounds), polyesters, polyureas, polyurethanes, as well as cellulosic fibers, to produce novelty fabrics. The present fibers are also recommended for felt making.

As stated in some of the examples of the present invention, the as-spun or cast films are post-moldable. This means that the extruded structure of low orientation can be adapted to any desired mold or form, a characteristic which opens a wide field of applications for the present polymer. The fibers, when oriented by drawing under appropriate conditions and subsequent heat-setting, lose thus post-moldability and retain their shape under normal handling conditions.

A number of polymers of the class described above have a high melting point or fiber stick temperature, which adapts them for uses where high temperature resistance is an important factor, e.g., press pad covers, heat insulation, etc.

This application is a continuation-in-part of United States applications, 383,410, filed September 30, 1953, and 749,602, filed July 21, 1958, and 555,761, filed December 28, 1955.

Many equivalent modifications of the above will be apparent to those skilled in the art from a reading of the above without a departure from the inventive concept.

What is claimed is:

1. A novel fiber-forming polyamide capable of orientation along the fiber axis and consisting of repeating structural units selected from the class consisting of

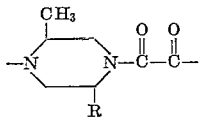

and

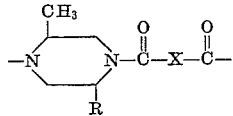

wherein —X— is a member of the class consisting of divalent aliphatic hydrocarbon radical containing from 1 to 11 carbon atoms, bis(alkylene)arylene, and bis(alkylene-oxy)arylene, and R is a member of the class consisting of hydrogen and methyl.

2. The polyamide of claim 1 wherein R is hydrogen.
3. The polyamide of claim 1 wherein R is methyl.
4. A polyamide of claim 1 wherein X is —(CH$_2$)$_4$—.
5. A polyamide of claim 1 wherein X is

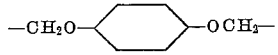

6. The polymer of claim 1 in the form of a fiber.
7. The polymer of claim 1 in the form of a film.
8. The fiber-forming polymer poly(2,5-dimethylpiperazine)adipamide.
9. The fiber-forming polymer poly(methyl piperazine)adipamide.
10. The fiber-forming polymer poly(methyl piperazine)sebacamide.
11. The fiber-forming polymer poly(2,5-dimethyl piperazine)oxalamide.
12. The fiber-forming polymer poly(2,5-dimethyl piperazine)sebacamide.
13. A synthetic linear polyamide being capable of being drawn into fibers from a melt which consists essentially of recurring structural units of the formula:

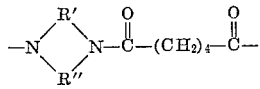

wherein R' is an ethylene radical and R" is a 1,2-propylene radical.

14. A synthetic linear polyamide being capable of being drawn into fibers from a melt which consists essentially of recurring structural units of the formula:

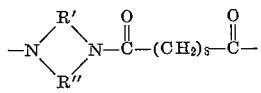

wherein R' is an ethylene radical and R" is 1,2-propylene radical.

References Cited in the file of this patent
UNITED STATES PATENTS

| | | |
|---|---|---|
| 2,130,948 | Carothers | Sept. 20, 1938 |
| 2,149,286 | Graves | Mar. 7, 1939 |
| 2,625,536 | Kirby | Jan. 13, 1953 |
| 2,813,775 | Steuber | Nov. 19, 1957 |
| 2,831,834 | Magat | Apr. 22, 1958 |

FOREIGN PATENTS

| | | |
|---|---|---|
| 529,414 | Belgium | June 30, 1954 |